United States Patent
Qu

(10) Patent No.: US 11,668,398 B2
(45) Date of Patent: Jun. 6, 2023

(54) CARTRIDGE RADIAL DOUBLE-END-FACE SPLIT TYPE MECHANICAL SEAL

(71) Applicant: PARBAT MACHINERY SUZHOU CO. LTD., Jiangsu (CN)

(72) Inventor: Guoping Qu, Jiangsu (CN)

(73) Assignee: AGILESENTRY, LLC, Sugar Land, TX (US)

( * ) Notice: Subject to any disclaimer, the term of this patent is extended or adjusted under 35 U.S.C. 154(b) by 63 days.

(21) Appl. No.: 17/477,362

(22) Filed: Sep. 16, 2021

(65) Prior Publication Data

US 2022/0112957 A1    Apr. 14, 2022

(30) Foreign Application Priority Data

Oct. 9, 2020   (CN) .......................... 202022229891.1

(51) Int. Cl.
*F16J 15/34*          (2006.01)

(52) U.S. Cl.
CPC ................................. *F16J 15/3488* (2013.01)

(58) Field of Classification Search
CPC ........................ F16J 15/3484; F16J 15/153488
See application file for complete search history.

(56) References Cited

U.S. PATENT DOCUMENTS

| | | | | |
|---|---|---|---|---|
| 4,483,540 A * | 11/1984 | Bordien | ............... | B63H 23/321 277/408 |
| 5,356,158 A * | 10/1994 | Simmons | ............. | F16J 15/3436 277/938 |
| 5,609,342 A * | 3/1997 | Peterson | ............... | F16J 15/3468 277/399 |
| 5,820,129 A * | 10/1998 | Reagan | ................. | F16J 15/3488 277/306 |
| 6,457,720 B1 * | 10/2002 | London | ................ | F16J 15/3488 277/374 |
| 7,438,519 B2 * | 10/2008 | Torres-Reyes | ........ | F04D 29/622 415/230 |
| 2002/0101038 A1 * | 8/2002 | Budrow | ................ | F04D 29/124 277/370 |
| 2006/0061041 A1 * | 3/2006 | Huang | .................. | F16J 15/3464 277/370 |
| 2006/0097456 A1 * | 5/2006 | Giggenbacher | ...... | F16J 15/3488 277/370 |
| 2010/0225066 A1 * | 9/2010 | Huang | ................... | F16J 15/348 277/579 |

* cited by examiner

*Primary Examiner* — Vishal A Patel

(57) ABSTRACT

Provided is a cartridge radial double-end-face split type mechanical seal, including: a shaft sleeve, a gland, a rotary ring, an outer stationary ring, and an inner stationary ring which are all of split type structure, split pieces of the shaft sleeve are spliced and sleeved on a main shaft, a rotary ring groove is disposed at the bottom of the shaft sleeve, split pieces of the rotary ring are spliced and fixed in the rotary ring groove, split pieces of the outer stationary ring are spliced and sealingly connected with the rotary ring, split pieces of the inner stationary ring are also spliced and sealingly connected with the rotary ring, an outer push ring is disposed at the top of the outer stationary ring, an inner push ring is disposed at the top of the inner stationary ring.

5 Claims, 1 Drawing Sheet

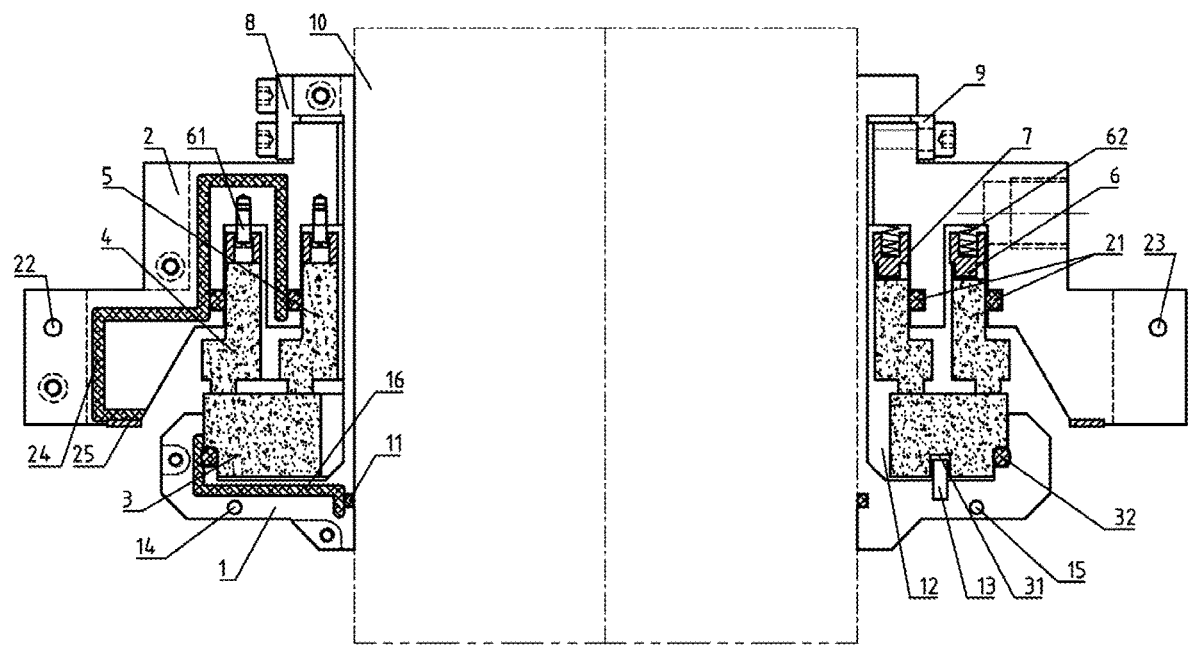

CARTRIDGE RADIAL DOUBLE-END-FACE SPLIT TYPE MECHANICAL SEAL

CROSS-REFERENCE TO RELATED APPLICATION

This application claims priority from the Chinese patent application 202022229891.1 filed Oct. 9, 2020, the content of which is incorporated herein in the entirety by reference.

TECHNICAL FIELD

The present utility model relates to mechanical seals and in particular to a cartridge radial double-end-face split type mechanical seal.

BACKGROUND

The major parts of a traditional mechanical seal include, for example, a rotary ring, a stationary ring, a gland and a shaft sleeve which are all closed cylindrical bodies. During a mounting process, other components can be mounted on a main shaft only after the mechanical seal is sleeved on the main shaft. During a dismounting process, the mechanical seal can be dismounted from the main shaft only after other components are removed from the main shaft. The dismounting and mounting procedures are so tedious that the production efficiency is reduced and extremely high precision mounting abilities of workers are required.

SUMMARY

The object of the present utility model is to provide a cartridge radial double-end-face split type mechanical seal which has ease of mounting and dismounting and high sealing performance.

In order to achieve the above object, the present utility model employs the following technical solution: a cartridge radial double-end-face split type mechanical seal, comprising: a shaft sleeve, a gland, a rotary ring, an outer stationary ring, and an inner stationary ring, wherein the shaft sleeve, the gland, the rotary ring, the outer stationary ring and the inner stationary ring all are center-split, split pieces of the shaft sleeve are spliced and sleeved on a main shaft, a first sealing ring is disposed between the shaft sleeve and the main shaft, a rotary ring groove is disposed at the bottom of the shaft sleeve, and split pieces of the rotary ring are spliced and fixed in the rotary ring groove, a second sealing ring is disposed between an outer side wall of the rotary ring and an inner side wall of the rotary ring groove, split pieces of the outer stationary ring are spliced and sealingly connected with the rotary ring, split pieces of the inner stationary ring are also spliced and sealingly connected with the rotary ring, an outer push ring is disposed at the top of the outer stationary ring, an inner push ring is disposed at the top of the inner stationary ring, split pieces of the gland are spliced and sleeved on the shaft sleeve, a moving gap is reserved between the gland and the outer push ring/inner push ring, a plurality of drive pieces and a plurality of elastic pieces are disposed between the gland and the outer push ring/inner push ring, and a third sealing ring is disposed between the gland and outer side walls of the outer stationary ring and the inner stationary ring respectively.

Furthermore, in the above cartridge radial double-end-face split type mechanical seal, the outer push ring and the inner push ring both are center-split and same in structure; with the outer push ring as an example, a plurality of stepped through holes and spring holes are disposed uniformly in a spacing along a circumference in the outer push ring, one drive screw is inserted as a drive piece through each stepped through hole, the drive screw is protruded upwardly out of the outer push ring to thread-connect with the gland, one spring is placed as an elastic piece in each spring hole, and the top of the spring is abutted against the gland.

Furthermore, in the above cartridge radial double-end-face split type mechanical seal, a connection structure between the rotary ring and the rotary ring groove is as follows: a plurality of cylindrical pins are disposed uniformly in a spacing along a circumference on a bottom wall of the rotary ring groove, a plurality of cylindrical holes are disposed uniformly in a spacing along a circumference at the bottom of the rotary ring, the rotary ring is placed in the rotary ring groove, and each cylindrical pin in the rotary ring groove protrudes into each cylindrical hole on the rotary ring respectively.

Furthermore, in the above cartridge radial double-end-face split type mechanical seal, a plurality of T-shaped limiting blocks are disposed uniformly in a spacing along a circumference between the gland and the shaft sleeve, a screw is disposed at an upper section of the T-shaped block and penetrated through the shaft sleeve to connect with the main shaft, and a lower section of the T-shaped block is fixedly connected with the gland through a screw.

Furthermore, in the above cartridge radial double-end-face split type mechanical seal, a plurality of L-shaped limiting blocks are disposed uniformly in a spacing along a circumference on a shaft shoulder of the gland, and a screw is disposed on the L-shaped limiting block and penetrated through the gland to connect with the shaft sleeve.

Furthermore, in the above cartridge radial double-end-face split type mechanical seal, a gland gasket is disposed between the split pieces of the gland, a first locating pin and a first locating hole in correspondence are disposed between the split pieces of the gland, and the split pieces of the gland are tightly connected through a screw.

Furthermore, in the above cartridge radial double-end-face split type mechanical seal, a flat gasket is disposed on a bottom wall of the gland.

Furthermore, in the above cartridge radial double-end-face split type mechanical seal, a shaft sleeve gasket is disposed between the split pieces of the shaft sleeve, a second locating pin and a second locating hole in correspondence are disposed between the split pieces of the shaft sleeve, and the split pieces of the shaft sleeve are tightly connected through a screw.

The present utility model has the following advantages: because the shaft sleeve, the gland, the rotary ring, the outer stationary ring and the inner stationary ring are all made into split type structures, it is not required to sleeve the mechanical seal from an end of the main shaft in a case of mounting or replacing the mechanical seal. In this case, it is not required to dismount other components from the main shaft. Therefore, the work load is reduced and the working efficiency is improved. Furthermore, when the split type mechanical seal bears a medium pressure, a contact pressure between the rotary ring and the outer stationary ring/the inner stationary ring increases along with increase of a pressure of the sealed medium, thus improving a resistance of the sealed medium flowing out of a sealing surface. Further, the sealing effect for the medium is further improved by sealingly connecting the dual-stationary ring structure of the outer stationary ring and the inner stationary ring with the rotary ring.

BRIEF DESCRIPTIONS OF THE DRAWINGS

FIG. 1 is a sectional structural diagram of a cartridge radial double-end-face split type mechanical seal according to the present utility model.

DETAILED DESCRIPTIONS OF EMBODIMENTS

The technical solution of the present utility model will be further described below in combination with accompanying drawings and specific preferred embodiments.

As shown in FIG. 1, the present utility model provides a cartridge radial double-end-face split type mechanical seal, comprising: a shaft sleeve 1, a gland 2, a rotary ring 3, an outer stationary ring 4, and an inner stationary ring 5, wherein the shaft sleeve 1, the gland 2, the rotary ring 3, the outer stationary ring 4 and the inner stationary ring 5 all are center-split, split pieces of the shaft sleeve 1 are spliced and sleeved on a main shaft 10, a first sealing ring 11 is disposed between the shaft sleeve 1 and the main shaft 10, a rotary ring groove 12 is disposed at the bottom of the shaft sleeve 1, and split pieces of the rotary ring 3 are spliced and fixed in the rotary ring groove 12. The specific connection structure is as follows: a plurality of cylindrical pins 13 are disposed uniformly in a spacing along a circumference on a bottom wall of the rotary ring groove 12, a plurality of cylindrical holes 31 are disposed uniformly in a spacing along a circumference at the bottom of the rotary ring 3, the rotary ring 3 is placed in the rotary ring groove 12, and each cylindrical pin 13 in the rotary ring groove 12 protrudes into each cylindrical hole 31 on the rotary ring 3 respectively. A second sealing ring 32 is disposed between an outer side wall of the rotary ring 3 and an inner side wall of the rotary ring groove 12, split pieces of the outer stationary ring 4 are spliced and sealingly connected with the rotary ring 3, split pieces of the inner stationary ring 5 are also spliced and sealingly connected with the rotary ring 3, an outer push ring 6 is disposed at the top of the outer stationary ring 4, an inner push ring 7 is disposed at the top of the inner stationary ring 5, split pieces of the gland 2 are spliced and sleeved on the shaft sleeve 1, a moving gap is reserved between the gland 2 and the outer push ring 6/inner push ring 7, the outer push ring 6 and the inner push ring 7 both are center-split and same in structure; with the outer push ring 6 as an example, a plurality of stepped through holes and spring holes are disposed uniformly in a spacing along a circumference in the outer push ring 6, one drive screw 61 is inserted as a drive piece through each stepped through hole, the drive screw 61 is protruded upwardly out of the outer push ring 6 to thread-connect with the gland 2, one spring 62 is placed as an elastic piece in each spring hole, and the top of the spring 62 is abutted against the gland. A third sealing ring 21 is disposed between the gland 2 and outer side walls of the outer stationary ring 4 and the inner stationary ring 5 respectively.

In this embodiment, a plurality of T-shaped limiting blocks 8 are disposed uniformly in a spacing along a circumference between the gland 2 and the shaft sleeve 1, a screw is disposed at an upper section of the T-shaped block 8 and penetrated through the shaft sleeve 1 to connect with the main shaft 10, and a lower section of the T-shaped block 8 is fixedly connected with the gland 2 through a screw. A plurality of L-shaped limiting blocks 9 are disposed uniformly in a spacing along a circumference on a shaft shoulder of the gland 2, and a screw is disposed on the L-shaped limiting block 9 and penetrated through the gland 2 to connect with the shaft sleeve 1.

In this embodiment, a first locating pin 22 and a first locating hole 23 in correspondence are disposed between the split pieces of the gland 2, and the split pieces of the gland 2 are tightly connected through a screw. A gland gasket 24 is disposed between the split pieces of the gland 2, and a flat gasket 25 is disposed on a bottom wall of the gland 2.

In this embodiment, a second locating pin 14 and a second locating hole 15 in correspondence are disposed between the split pieces of the shaft sleeve 1, the split pieces of the shaft sleeve 1 are tightly connected through a screw, and a shaft sleeve gasket 16 is disposed between the split pieces of the shaft sleeve 1, The present utility model has the following advantages: because the shaft sleeve, the gland, the rotary ring, the outer stationary ring and the inner stationary ring are all made into split type structures, it is not required to sleeve the mechanical seal from an end of the main shaft in a case of mounting or replacing the mechanical seal. In this case, it is not required to dismount other components from the main shaft. Therefore, the work load is reduced and the working efficiency is improved. Furthermore, when the split type mechanical seal bears a medium pressure, a contact pressure between the rotary ring and the outer stationary ring/the inner stationary ring increases along with increase of a pressure of the sealed medium, thus improving a resistance of the sealed medium flowing out of a sealing surface. Further, the sealing effect for the medium is further improved by sealingly connecting the dual-stationary ring structure of the outer stationary ring and the inner stationary ring with the rotary ring.

What is claimed is:

1. A cartridge radial double-end-face split mechanical seal, comprising: a shaft sleeve, a gland, a rotary ring, an outer stationary ring, and an inner stationary ring, wherein the shaft sleeve, the gland, the rotary ring, the outer stationary ring and the inner stationary ring all are center-split, split pieces of the shaft sleeve are spliced and sleeved on a main shaft, a first sealing ring is disposed between the shaft sleeve and the main shaft, a rotary ring roove is disposed at the bottom of the shaft sleeve, and split pieces of the rotary ring are spliced and fixed in the rotary ring groove, a second sealing ring is disposed between an outer side wall of the rotary ring and an inner side wall of the rotary ring groove, split pieces of the outer stationary ring are spliced and sealingly connected with the rotary ring, split pieces of the inner stationary ring are also spliced and sealingly connected with the rotary ring, an outer push ring is disposed at the top of the outer stationary ring, an inner push ring is disposed at the top of the inner stationary ring, split pieces of the gland are spliced and sleeved on the shaft sleeve, a moving gap is reserved between the gland and the outer push ring and inner push ring, a plurality of drive pieces and a plurality of elastic pieces are disposed between the gland and the outer push ring and inner push ring, and a third sealing ring is disposed between the gland and outer side walls of the outer stationary ring and the inner stationary ring respectively, wherein the outer push ring and the inner push ring both are center-split and same in structure; with the outer push ring, a plurality of stepped through holes and spring holes are disposed uniformly in a spacing along a circumference in the outer push ring, one drive screw is inserted as a drive piece of the plurality of the drive pieces through each stepped through hole of the plurality of stepped through holes, the drive screw is protruded upwardly out of the outer push ring to thread-connect with the gland, one spring is placed as an elastic piece of the plurality of elastic pieces in each spring hole of the plurality of spring holes, and the top of the spring abutted against the gland, wherein a plurality of T-shaped limiting blocks are disposed uniformly in a spacing along a circumference between the gland and the shaft sleeve, a first screw is disposed at an upper section of the T-shape block and penetrated through the shaft sleeve to connect with the main shaft, and a lower section of the T-shaped bock is fixedly connected with the gland through a second screw, wherein a plurality of L-shaped limiting blocks are disposed uniformly in a space along a circumference on a shaft shoulder of the gland, and a third screw is disposed on the L-shaped limiting block and penetrated through the gland to connect with the shaft sleeve.

2. The cartridge radial double-end-face split mechanical seal according to claim 1, wherein a connection structure between the rotary ring and the rotary ring groove is as follows: a plurality of cylindrical pins are disposed uniformly in a spacing along a circumference on a bottom wall of the rotary ring groove, a plurality of cylindrical holes are disposed uniformly in a spacing along a circumference at the bottom of the rotary ring, the rotary ring is placed in the rotary ring groove, and each cylindrical pin in the rotary ring groove protrudes into each cylindrical hole on the rotary ring respectively.

3. The cartridge radial double-end-face split mechanical seal according to claim 1, wherein a gland gasket is disposed between the split pieces of the gland, a first locating pin and a first locating hole in correspondence are disposed between the split pieces of the gland, and the split pieces of the gland are tightly connected through a screw.

4. The cartridge radial double-end-face split mechanical seal according to claim 1, wherein a flat gasket is disposed on a bottom wall of the gland.

5. The cartridge radial double-end-face split mechanical seal according to claim 1, wherein a shaft sleeve gasket is disposed between the split pieces of the shaft sleeve, a second locating pin and a second locating hole in correspondence are disposed between the split pieces of the shaft sleeve, and the split pieces of the shaft sleeve are tightly connected through a screw.

* * * * *